US008141087B2

(12) United States Patent  (10) Patent No.: US 8,141,087 B2
Chauvet et al.  (45) Date of Patent: Mar. 20, 2012

(54) RESOLVING COMPUTING RESOURCE DEADLOCKS BASED ON PRIORITY AND DEPENDENT PROCESSES

(75) Inventors: Philip R. Chauvet, Tuscon, AZ (US); David Charles Reed, Tuscon, AZ (US); Michael Robert Scott, Tuscon, AZ (US); Max Douglas Smith, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 11/278,179

(22) Filed: Mar. 31, 2006

(65) Prior Publication Data

US 2007/0233924 A1  Oct. 4, 2007

(51) Int. Cl.
*G06F 9/46* (2006.01)
(52) U.S. Cl. ........................................ 718/103; 718/104
(58) Field of Classification Search .................. 718/103, 718/104, 102
See application file for complete search history.

(56) References Cited

U.S. PATENT DOCUMENTS

| 5,016,167 | A |   | 5/1991 | Nguyen et al. ................. 364/200 |
| 5,832,484 | A | * | 11/1998 | Sankaran et al. .................... 1/1 |
| 6,223,200 | B1 |   | 4/2001 | Barnes et al. .................. 709/100 |
| 6,681,241 | B1 |   | 1/2004 | Fagen et al. .................... 709/104 |
| 6,721,775 | B1 |   | 4/2004 | Fagen et al. .................... 709/100 |
| 6,738,872 | B2 |   | 5/2004 | Van Huben et al. .......... 711/150 |
| 2003/0028638 | A1 | * | 2/2003 | Srivastava et al. ............ 709/225 |
| 2003/0135537 | A1 |   | 7/2003 | Mikael et al. |
| 2005/0028157 | A1 | * | 2/2005 | Betancourt et al. ........... 718/100 |

FOREIGN PATENT DOCUMENTS

CN  1703676  11/2005

OTHER PUBLICATIONS

Sinha, M. and Natarajan, N. A Priority Based Distributed Deadlock Detection Algorithm. IEEE Transactions on (0098-5589), Jan. 1985, vol. SE-11, Iss. 1, p. 67-70 [online], [retrieved on Mar. 22, 2010]. Retrieved from the Internet <URL: http://ieeexplore.ieee.org/stamp/stamp.jsp?isnumber=35868&arnumber=1701899&punumber=32&tag=1>.*
Chen et al.; "*Stochastic Analysis of Distributed Deadlock Scheduling*" ACM Digital Library, Jul. 2005.
D. Frailey, "*A Practical Approach to Managing Resources and Avoiding Deadlocks*", ACM Digital Library, May 1973, vol. 16 No. 5.
J. Howard Jr., "Mixed Solutions for the Deadlock Problem", ACM Digital Library, Jul. 1973, vol. 16, No. 7.
A. Thomasian, "*Concurrency Control: Method, Performance, and Analysis*", ACM Digital Library, Mar. 1998, vol. 30 No. 1.

* cited by examiner

*Primary Examiner* — Jennifer To
*Assistant Examiner* — Brian Chew
(74) *Attorney, Agent, or Firm* — Kunzler Needham Massey & Thorpe (57) ABSTRACT

An apparatus, system, and method are disclosed for resolving computing resource deadlocks. In one embodiment, the present invention includes detecting a set of deadlocked processes within a set of executing processes, cancelling a lowest priority process of the set of deadlocked processes, generating a requested resources report for the set of executing processes, and enabling a user to assign a priority level to a process. In one embodiment, resolving computing resource deadlocks will efficiently detect deadlocks by using a report already generated by the operating system detailing information about allocated resources. By analyzing the resources report to gain information regarding executing processes, deadlocks may be easily determined and remedied. Resolving computing resource deadlocks may be conducted by a utility or it may run as a service of the operating system.

16 Claims, 5 Drawing Sheets

… , $R_z$, from requesting another resource unless it matches

RESOLVING COMPUTING RESOURCE DEADLOCKS BASED ON PRIORITY AND DEPENDENT PROCESSES

BACKGROUND OF THE INVENTION

1. Field of the Invention

This invention relates to computing resource deadlocks and more particularly relates to resolving computing resource deadlocks.

2. Description of the Related Art

A deadlock occurs when a process is unable to secure a resource that the process needs to complete. For example, when a first process requires a resource held by a second process, which is waiting for a resource held by the first process. This scenario prevents either process from completing. Deadlocks dramatically hinder system performance by squandering resources needed to fulfill other requests. Though a solution to the problem is theoretically simplistic, accounting for everything to produce an adequate solution is difficult. Current solutions have not eliminated the problem. As a result, millions of dollars worth of systems outages per year are attributed to deadlocks.

One approach to avoiding deadlocks is by applying a standard order to allocate resources to processes. This approach restricts a process holding a resource of an ordered class, $R_1$, …, $R_z$, from requesting another resource unless it matches predefined criteria. For example, a process holding a resource of class d, $R_d$, can only request a resource of class a, $R_a$, if a>d. This type of restriction hinders optimum performance by not providing processes with possible access to all resources.

Similarly, theories for deadlock prevention exist, but these theories either contain flaws or are impractical. For example, prohibiting exclusive access to a resource is impractical for resources that cannot be spooled. Similarly, requiring processes to request all the resources they will need before starting up is impractical because it would be necessary for the system to know in advance all resources needed regardless of program flow.

From the foregoing discussion, it should be apparent that a need exists for an apparatus, system, and method for resolving computing resource deadlocks. Beneficially, such an apparatus, system, and method would efficiently resolve computing deadlocks and reduce the immense amount of money lost each year due to computing resource deadlocks.

SUMMARY OF THE INVENTION

The present invention has been developed in response to the present state of the art, and in particular, in response to the problems and needs in the art that have not yet been fully solved by currently available solutions. Accordingly, the present invention has been developed to provide an apparatus, system, and method for resolving computing deadlocks that overcome many or all of the above-discussed shortcomings in the art.

The apparatus for resolving computing deadlocks is provided with a logic unit containing a plurality of modules configured to functionally execute the necessary steps of detecting a set of deadlocked processes within a set of executing processes, cancelling a lowest priority process of the set of deadlocked processes, enabling a user to assign a priority level to a process, and generating a requested resources report for the set of executing processes. These modules in the described embodiments include a deadlock detection module, a deadlock resolution module, a priority assignment module, and a resource tracking module.

The apparatus, in one embodiment, is configured to detect a set of deadlocked process within a set of executing processes. The apparatus may also be configured to cancel a process of the set of deadlocked processes. In one embodiment, the process selected to be cancelled has the lowest priority. If more than one process has the lowest priority, secondary selection criteria may be employed such as the process with the greatest number of dependent processes or the process with the shortest wait time.

The apparatus may be configured to enable a user to assign a priority level to a process. A priority level may be assigned by default to satisfy the requirement that all processes have a priority level. The priority level may be adjusted at a later time prior to process completion. The user may be able to adjust the priority level through a graphical user interface or a command line interface.

The apparatus may be configured to generate a resources report which contains information for the resources requested by the set of executing processes. The report may be in the form of a sequential file. The report may be generated by information obtained from an operating system, or it may be generated from the operating system itself. After the report is generated, an analysis of the report may be required. The apparatus may process the requested resources report to detect if a set of deadlocked processes exist.

In one embodiment to detect a deadlock, the exclusive holder of each resource is scanned to determine if it is waiting on any additional resources listed in the report. If the holder is waiting on a different resource, the owner of that second resource is identified. The owner of the second resource is then compared with the waiters for the first resource. If the owner of the second resource is a waiter on the first resource then a deadlock exists.

A system of the present invention is also presented for resolving computing resource deadlocks. The system may be embodied in a computing system. In particular, the system, in one embodiment, includes a system bus, one or more storage devices, a network interface card, a central processing unit (CPU), a main memory, an operating system, and a network backbone.

The system may further include resources of the operating system, executing processes, and a process monitor comprising the modules for resolving computing resource deadlocks. The services, the processes, and the process monitor may be included in the operating system and stored partially or fully in main memory. The process monitor, in one embodiment, is coupled to the network backbone and may be served to other devices residing on the network.

A method of the present invention is also presented for resolving computing resource deadlocks. The method in the disclosed embodiments substantially includes the steps necessary to carry out the functions presented above with respect to the operation of the described apparatus and system. In one embodiment, the method includes operations to detect a set of deadlocked processes within a set of executing processes and cancel a lowest priority set of deadlocked processes. The method also may include operations to enable a user to assign a priority level to a process and generate a requested resources report for the set of executing processes.

In a further embodiment, the method includes processing the requested resources report to determine if a deadlock exists. If a deadlock exists, a process may be selected to be cancelled if it has the lowest priority. If multiple processes have the lowest priority, then the process in the set of deadlocked processes that has the greatest number of dependent resources or the shortest wait time may be selected. Cancelling the selected process may free the resource requested by the unselected process.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
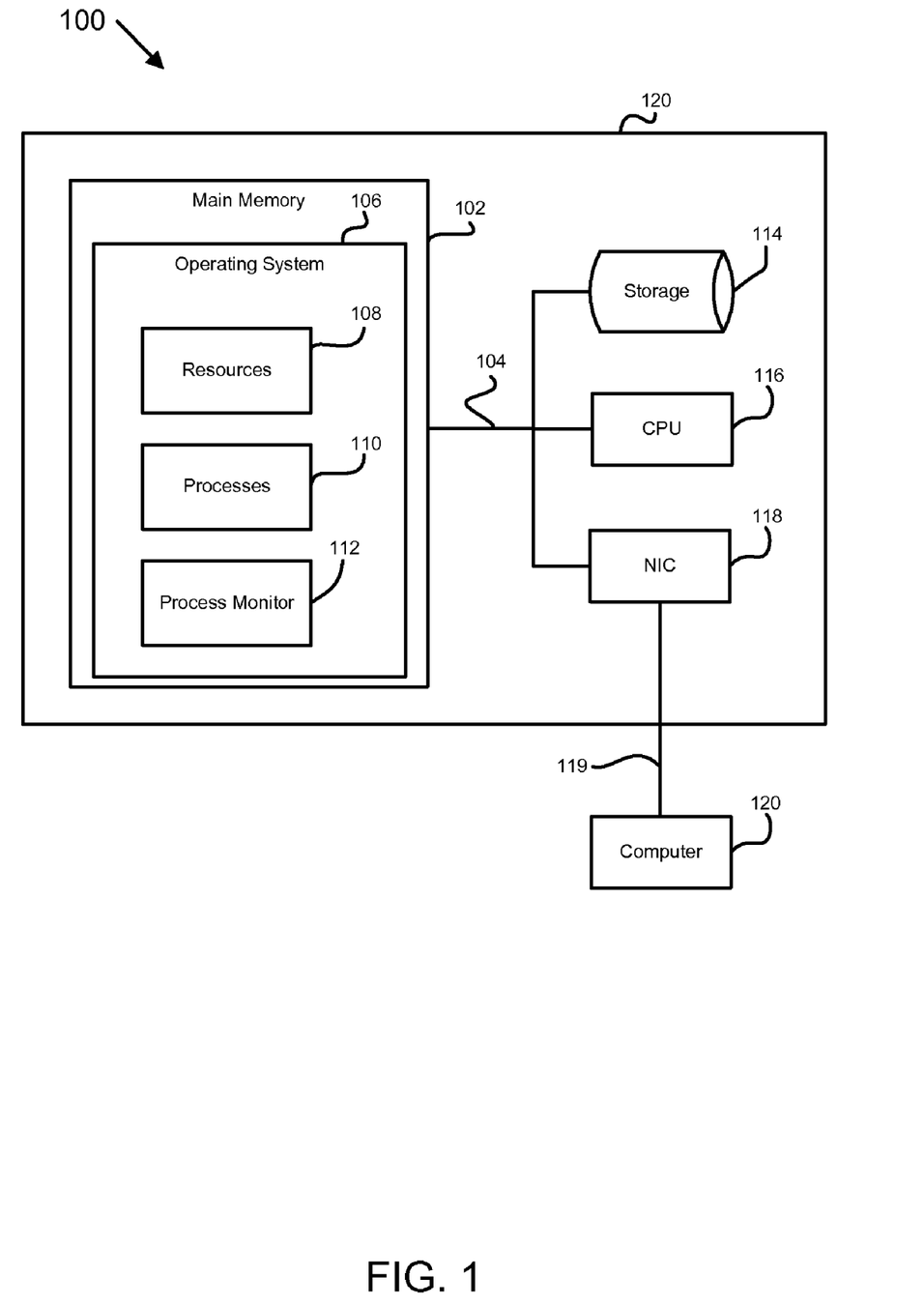
FIG. 1 is a schematic block diagram illustrating one embodiment of a computer system in accordance with the present invention.

FIG. 1 is a schematic block diagram of a computing system 100 in accordance with the present invention. The depicted computing system 100 includes a main memory 102, a system bus 104, an operating system 106, resources 108, processes 110, a process monitor 112, one or more storage devices 114, a central processing unit (CPU) 116, a network interface card (NIC) 118, a network 119, and a computer 120. The computing system 100 is one example of a computing system suitable of deployment of the present invention.

The system bus 104 may provide a communication channel among components within the computer 120. The storage device 114 may be a component in the computer 120. The storage device 114 may include a variety of devices such as a direct access storage device (DASD), a tape drive, or the like. In certain embodiments, the storage device may be writeable.

The CPU 116 may be connected to the system bus 104. In one embodiment, the CPU processes and transmits data received over the system bus 104 to components connected to the system bus 104 such as the main memory 102. The main memory 102 may be volatile storage. In one embodiment, the main memory 102 stores the operating system 106, the operating system resources 108, the processes 110, and the process monitor 112. The process monitor 112 comprises the modules for resolving computing resource deadlocks.

The NIC 118 may communicate with the computer 120 via the system bus 104. The NIC 118 may communicate with the network 119. In one embodiment, the NIC 118 creates a communication link between the system bus 104 and the network 119 enabling the computer 120 to communicate with devices on the same network 119 such as another computer 120. The computer 120 may be a server to allow the process monitor 112 to be served to other computers on the network 119.

Figure 2:
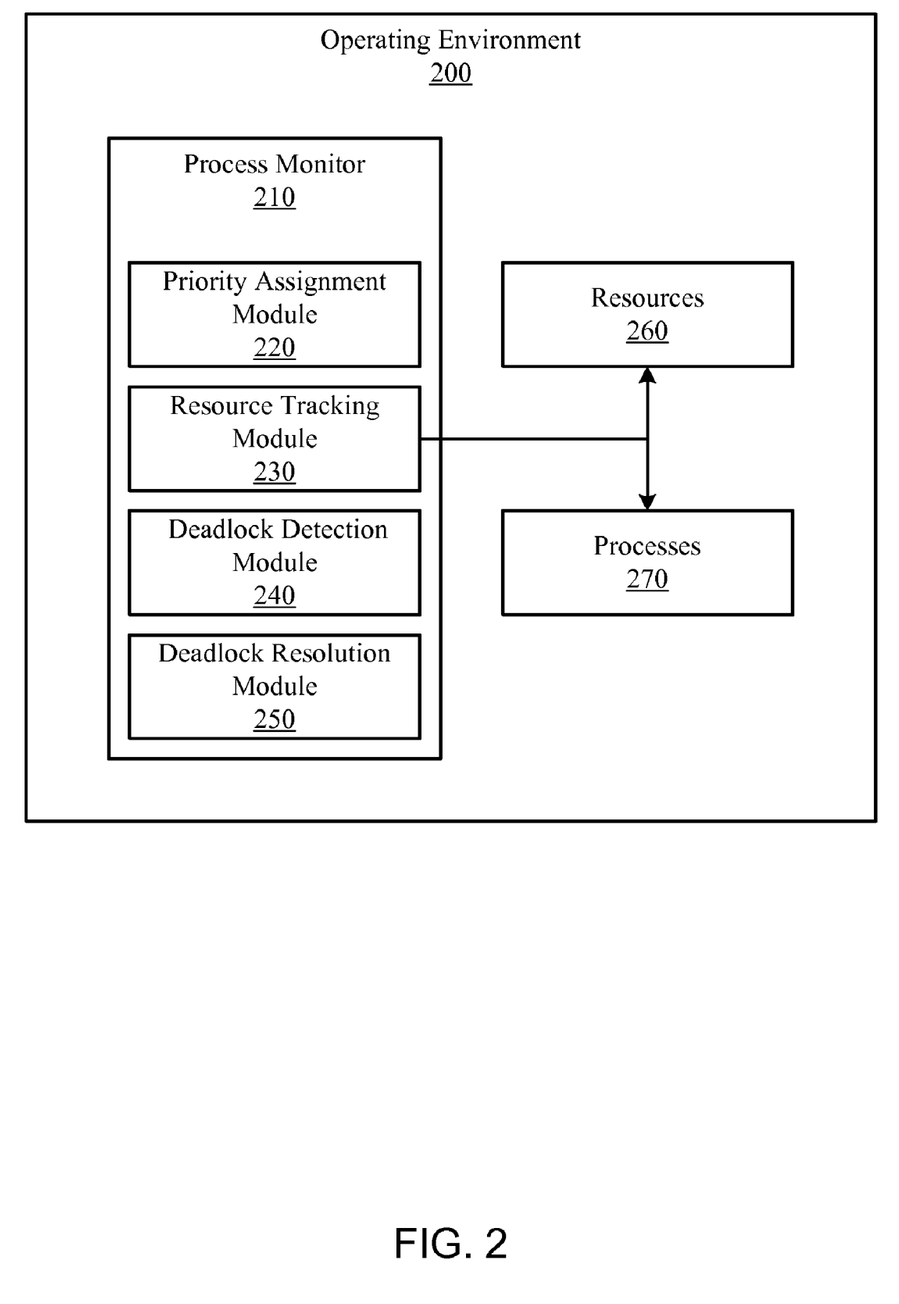
FIG. 2 is a schematic block diagram illustrating one embodiment of an operating environment in accordance with the present invention.

FIG. 2 is a schematic block diagram of an operating environment 200 in accordance with the present invention. The depicted operating environment 200 includes a process monitor 210, a priority assignment module 220, a resource tracking module 230, a deadlock detection module 240, a deadlock resolution module 250, resources 260, and processes 270. The depicted operating environment 200 resolves computing resource deadlocks.

The depicted process monitor 210 includes the modules necessary for resolving computing resource deadlocks. The process monitor 210 may be conducted by a utility or conducted as a service of the operating system. The priority assignment module 220 may facilitate modification of a process' default priority level. In one embodiment, the priority assignment module 220 is accessed through a graphical user interface. In another embodiment, the priority assignment module 220 is accessed through a command line interface. Access to the priority assignment module 220 may allow designation of a process to be restarted upon resource availability.

The resource tracking module 230 may generate a report of resources facilitating execution of a set of processes 270 within an operating environment 200. The report may be a list of currently allocated resources. In one embodiment, the report may be generated by the operating system resource contention services. In a preferred embodiment, the report is analyzed to determine which process 270 is holding which resource 260.

The process 270 may then be scanned to obtain information such as process identification, priority level, time in queue, resources controlled by it, resources requested by it, and resources requested by it that are unavailable. The resource tracking module 230 may deliver the report and process information to the deadlock detection module 240. In one embodiment, the report and process information are generated and delivered in intervals. In another embodiment, the report and process information may be generated and delivered upon a request.

The deadlock detection module 240 may analyze the information delivered by the resource tracking module 230 to detect one or more deadlock conditions among processes 270. For example, a deadlock may be detected when the report indicates that one process, P1, controls a resource, R1, and requires another resource, R2, for process completion; while another process, P2, controls R2 and requires R1 for process completion. Since both processes require an unavailable resource, neither process can finish. Likewise, since neither process can finish, the resources they currently control remain unavailable.

The deadlock detection module 240 may identify sets of deadlocked processes for the deadlock resolution module 250. The deadlock resolution module 250 may resolve a deadlock among processes 270 by cancelling a lowest priority process within the set of deadlocked processes. In one embodiment, if the set of deadlocked processes have multiple processes with the lowest priority, the process selected for cancellation has the greatest number of dependent processes. In another embodiment, if the set of deadlocked processes have multiple processes with the lowest priority, the process selected for cancellation has the shortest wait time.

The deadlock resolution module 250 may restart the canceled process after cancellation. In one embodiment, the restarted process continues from the point of cancellation. In another embodiment, the restarted process is initiated from its beginning.

The resources 260 of the operating environment 200 may include allocations of main memory to facilitate completion of processes 270. The processes 270 may be services of operating environment 200 or user submitted tasks. The processes 270 may be assigned priority levels and resources 260 necessary to facilitate completion.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
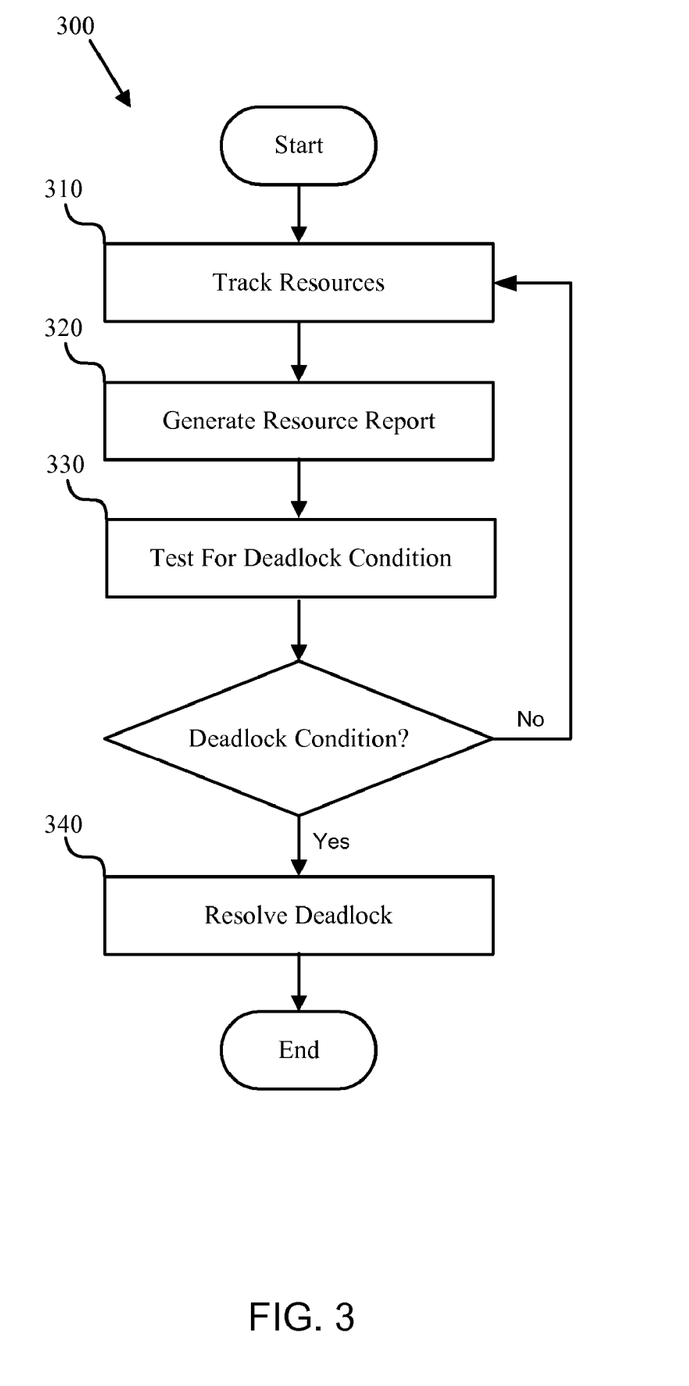
FIG. 3 is a schematic flow chart diagram illustrating one embodiment of a method for resolving computing resource deadlocks in accordance with the present invention.

FIG. 3 depicts one embodiment of a method 300 for resolving computing deadlocks. The method 300 includes tracking 310 resources associated with a computing environment, generating 320 a resource report, testing 330 for one or more deadlock conditions, and resolving 340 the deadlocks. The depicted method 300 facilitates resolving computing deadlocks in a prioritized manner.

Tracking 310 resources may include acquiring information about a resource facilitating execution of a process 270 within an operating environment 200. The information may be in the form of a list of currently allocated resources. In one embodiment, tracking 310 resources is conducted by a standalone utility. In another embodiment, tracking 310 resources is conducted as a service of the operating system.

Generating 320 a resource report may include categorizing the information obtained from tracking 310 resources. The resource information may be categorized to optimize the ability to determine deadlocks. In one embodiment, the information is acquired from the operating system resource contention services. In a preferred embodiment, generating 320 a resource report includes pulling resource information into a sequential file. Generating 320 a resource report may provide information to determine if there is a set of deadlocked processes by testing 330 for deadlocked conditions.

Testing 330 for deadlocked conditions may include analyzing the information obtained by generating 320 a resource report. In one embodiment, an exclusive holder of each resource would be scanned to see if it is waiting on any additional resources listed in the report. If the holder is waiting on a different resource, the owner of that second resource is identified. The owner of the second resource is then compared with the waiters for the first resource. If the owner of the second resource is a waiter on the first resource then a deadlock condition exists.

Resolving 340 deadlocks may include cancelling a selected process. In one embodiment, the cancelled process is restarted from its beginning. In another embodiment, the cancelled process is restarted from the last command executed. And, in another embodiment, the cancelled process is not restarted but must be resubmitted.

Figure 4:
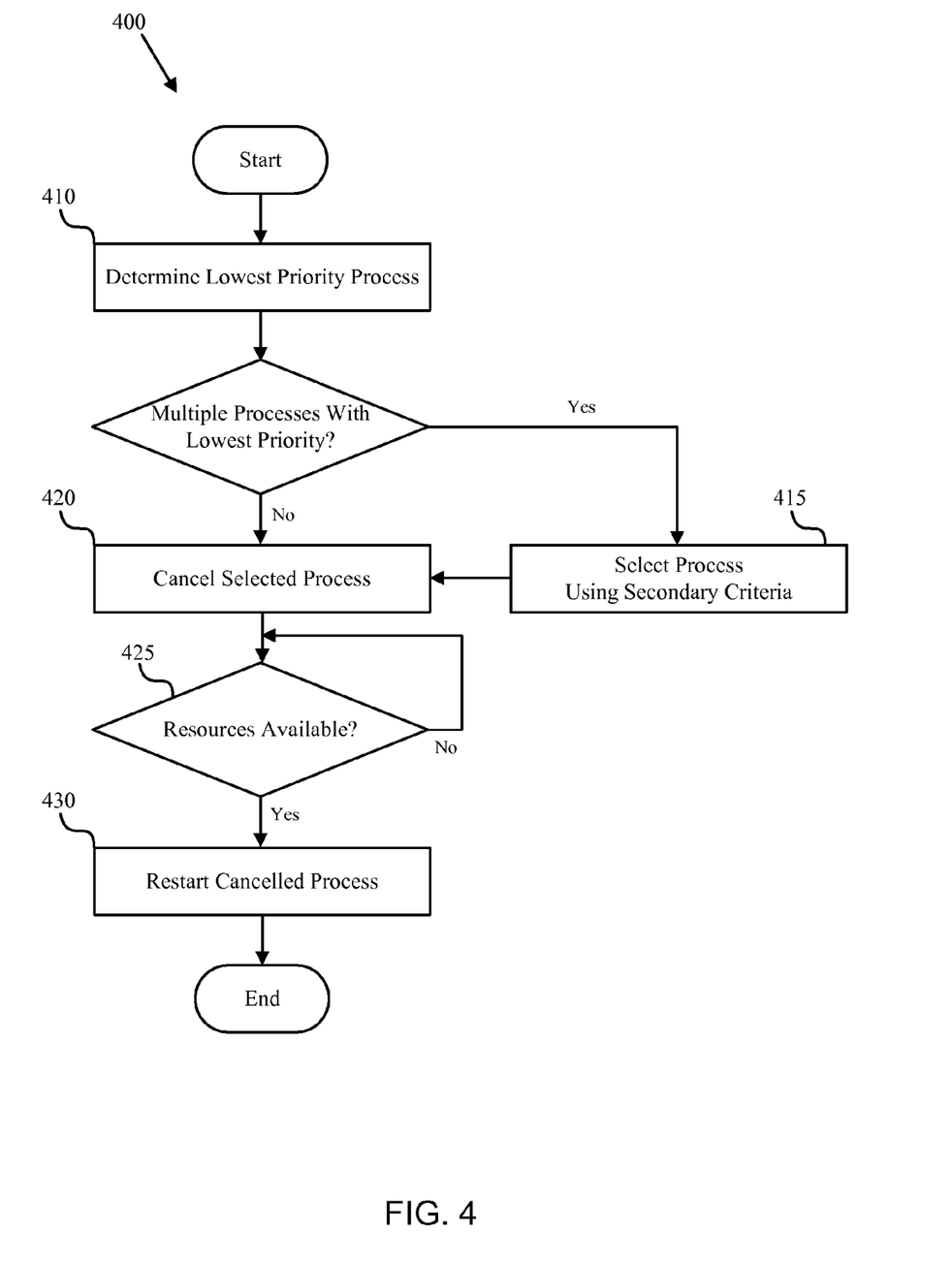
FIG. 4 is a schematic flow chart diagram illustrating another embodiment of a method for resolving computing resource deadlocks in accordance with the present invention.

FIG. 4 depicts one embodiment of a method 400 for resolving 340 deadlocks. The method 400 includes determining 410 a lowest priority process, determining 415 a selected process, cancelling 420 the selected process, and restarting 430 the cancelled process. The depicted method 400 facilitates resolving a computing deadlock.

In one embodiment, determining 410 the lowest priority process includes scanning the set of processes detected to be deadlocked. An attribute of each process may be a priority level. The priority level of a process may be a default priority level or a user assigned priority level. The priority level of all processes determined to be in the set of deadlocked processes may compared. The process selected for cancellation may be the process with the lowest priority level.

If more than one process has the lowest priority level, then secondary criteria for determining 415 the selected process may be used. In one embodiment, the processes with the lowest priority level are scanned to select the process that has the greatest number of dependent processes, processes waiting on resources held by another process. In another embodiment, the processes with the lowest priority level are scanned to select the process that has the shortest wait time.

Cancelling 420 the selected process may include terminating the process after the current instruction cycle. While the selected process of the set of deadlocked processes is being cancelled, one or more unselected processes may wait for the selected process' resources to be released. When the resources of the cancelled process are released, the unselected processes may request the resources for use. In one embodiment, processes are granted the released resources according to their priority level.

Subsequently, the cancelled process may wait 425 until the released resources are available for use. As soon as the resources are available, the method may continue by restarting 430 the cancelled process. In one embodiment, the cancelled process is restarted at the instruction cycle it was cancelled on. In another embodiment, the cancelled process is restarted at the first instruction cycle.

Figure 5:
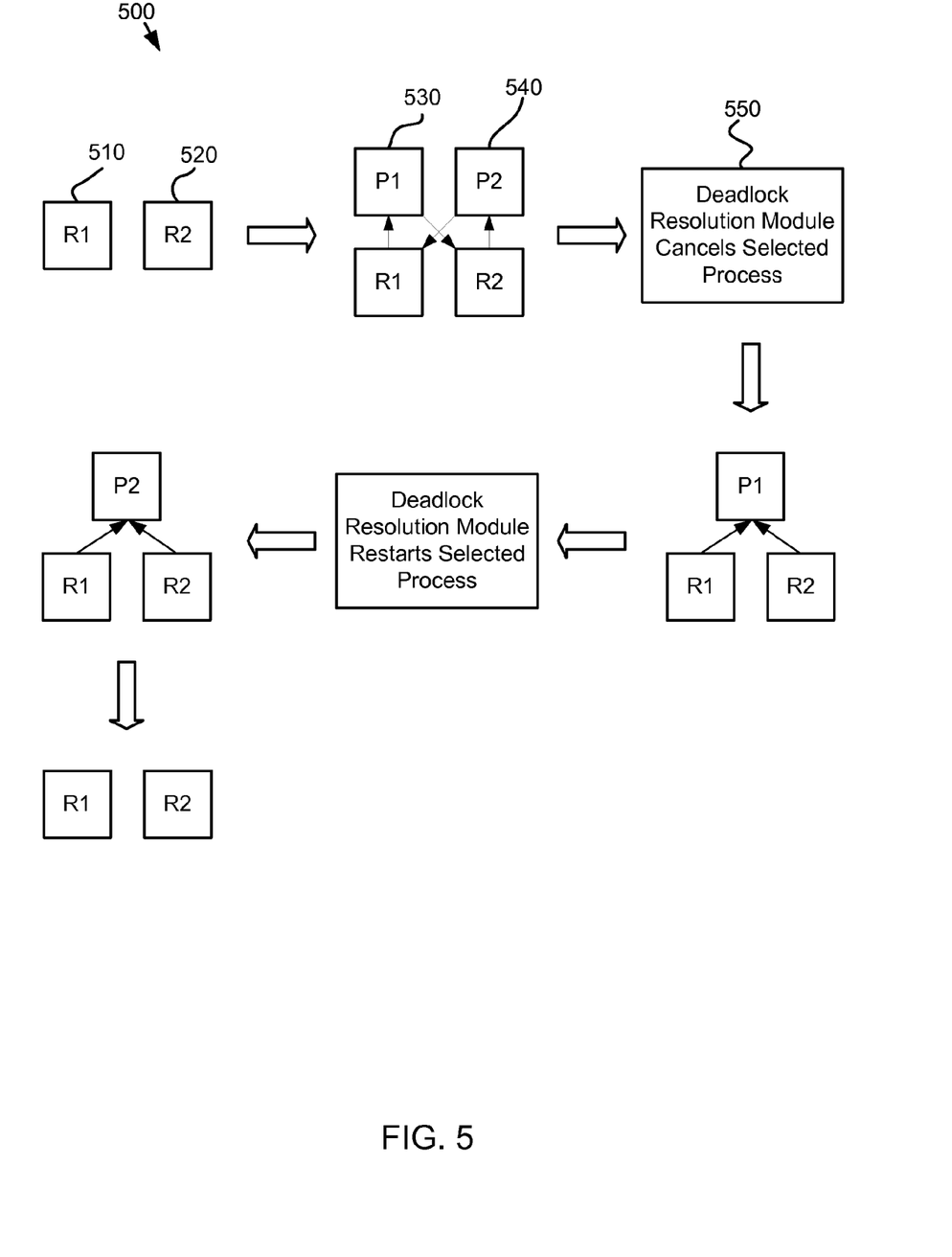
FIG. 5 is a process flow diagram depicting an example case of resolving computing resource deadlocks in accordance with the present invention.

FIG. 5 a process flow diagram depicting an example 500 of resolving computing deadlocks. The example 500 includes a first resource 510, a second resource 520, a first process 530, a second process 540, and a deadlock resolution module 550. The example 500 shows the relationships involved in resolving a particular computing deadlock.

A first resource 510 and a second resource 520 may be available to facilitate process completion. As depicted in the second step of example 500, a first process 530 may secure the first resource 510 and requests a second resource 520. Similarly, the second process 520 may secure the second resource 520 and requests the first resource 510. As depicted, a deadlock occurs because neither the first process 530 nor the second process 540 can finish without the use of the resource secured by the other process.

To resolve the deadlock, the deadlock resolution module 550 is configured to cancel the process with the lowest priority level. In the depicted method 500, the second process 540 is selected as the process with the lowest priority and subsequently cancelled. With the second resource 520 no longer secured by the second process 540 the second resource can be allocated to the first process 530 to facilitate completion.

Upon completion of the first process 530, the deadlock resolution module 550 restarts the cancelled second process 540. Consequently, the first and second resources 510, 520 have facilitated the completion of the first process 530 and are no longer secured by it. The first and second resources 510, 520 may therefore be allocated to the second process 540 to facilitate completion. Upon completion of the second process 540, the first and second resources 510, 520 are no longer needed by the processes 530 and 540 and may be allocated responsive to a request from another process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for resolving computing resource deadlocks, the apparatus comprising:
    a processor;
    a resource tracking module configured to, via the processor, generate a sequential resources report;
    a deadlock detection module configured to, via the processor, analyze the sequential resources report and detect a set of deadlocked processes within a set of executing processes;
    the set of deadlocked processes comprising a first process having a first resource and waiting for a second resource, and at least a second process having the second resource and waiting for the first resource;
    a deadlock resolution module configured to, via the processor, select a process of the set of deadlocked processes having a lowest priority, and if multiple processes of the set of deadlocked processes have the lowest priority, select a process of the multiple processes with a greatest number of dependent processes, and cancel the selected process, such that a resource of the selected process is released and available to a higher priority process.

2. The apparatus of claim 1, further comprising a priority assignment module configured to enable a user to assign a priority level to a process.

3. The apparatus of claim 1, wherein the resource tracking module is integral to an operating system.

4. The apparatus of claim 1, wherein the deadlock detection module is further configured to detect the set of deadlocked processes by processing the sequential resources report.

5. The apparatus of claim 1, wherein the deadlock resolution module is further configured to identify and cancel a process according to further criteria if multiple processes of the set of deadlocked processes have the lowest priority.

6. The apparatus of claim 5, wherein the further criteria identifies a process of the multiple processes with a shortest wait time.

7. A system for resolving computing resource deadlocks, the system comprising:
- a processor;
- an operating system configured to, via the processor, allocate resources to facilitate requests;
- a resource tracking module configured to, via the processor, generate a sequential resources report;
- a process monitor configured to, via the processor, analyze the sequential resources report and detect a set of deadlocked processes within a set of executing processes;
- the set of deadlocked processes comprising a first process having a first resource and waiting for a second resource, and at least a second process having the second resource and waiting for the first resource; and
- wherein the process monitor is further configured to select a process of the set of deadlocked processes having a lowest priority, and if multiple processes of the set of deadlocked processes have the lowest priority, select a process of the multiple processes with a greatest number of dependent processes, and cancel the selected process, such that a resource of the selected process is released and available to a higher priority process.

8. The system of claim 7, further comprising a storage subsystem.

9. The system of claim 7, further comprising a priority assignment module configured to enable a user to assign a priority level to a process.

10. The system of claim 7, wherein the process monitor is further configured to detect the set of deadlocked processes by processing the sequential resources report.

11. The system of claim 7, wherein the process monitor is further configured to identify and cancel a process according to further criteria if multiple processes of the set of deadlocked processes have the lowest priority.

12. A computer storage medium tangibly embodying a program of machine-readable instructions executable by a digital processing apparatus to perform operations for resolving computing resource deadlocks, the operations comprising:
- generating a sequential resources report;
- analyzing the sequential resources report and detecting a set of deadlocked processes within a set of executing processes;
- the set of deadlocked processes comprising a first process having a first resource and waiting for a second resource, and at least a second process having the second resource and waiting for the first resource; and
- selecting a process of the set of deadlocked processes having a lowest priority, and if multiple processes of the set of deadlocked processes have the lowest priority, selecting a process of the multiple processes with a greatest number of dependent processes, and cancelling the selected process, such that a resource of the selected process is released and available to a higher priority process.

13. The computer storage medium of claim 12, wherein the operations further comprise enabling a user to assign a priority level to a process.

14. The computer storage medium of claim 12, wherein the operations further comprise detecting the set of deadlocked processes comprises processing the sequential resources report.

15. The computer storage medium of claim 12, wherein the operations further comprise identifying and cancelling a process according to further criteria if multiple processes of the set of deadlocked processes have the lowest priority.

16. The computer storage medium of claim 15, wherein the further criteria identifies a process of the multiple processes with a shortest wait time.

* * * * *